United States Patent [19]

Kitahara et al.

[11] Patent Number: 5,446,511
[45] Date of Patent: Aug. 29, 1995

[54] ORIGINAL CONVEYING APPARATUS

[75] Inventors: Yoshihiko Kitahara, Ushiku; Kimiaki Hayakawa, Yokohama, both of Japan

[73] Assignee: Canon Kabushiki Kaisha, Tokyo, Japan

[21] Appl. No.: 273,130

[22] Filed: Jul. 14, 1994

[30] Foreign Application Priority Data

Jul. 19, 1993 [JP] Japan ................... 5-200073

[51] Int. Cl.[6] .................................. G03B 23/08
[52] U.S. Cl. ..................... 353/103; 353/DIG. 1; 353/DIG. 5
[58] Field of Search .................. 353/103, 118, DIG. 1, 353/DIG. 2, DIG. 3, DIG. 5, 120

[56] References Cited

U.S. PATENT DOCUMENTS

| | | | |
|---|---|---|---|
| 4,050,816 | 9/1977 | Stemmle | 355/75 |
| 4,153,353 | 5/1979 | Gold | 353/DIG. 1 |
| 4,512,658 | 4/1985 | Winkelmann | 355/14 SH |
| 4,756,616 | 7/1988 | Min et al. | 353/103 |
| 5,059,020 | 10/1991 | Géniéis | 353/103 |
| 5,172,142 | 12/1992 | Stephenson | 353/103 |
| 5,198,846 | 3/1993 | Zilber | 353/103 |
| 5,339,122 | 8/1994 | Polak et al. | 353/103 |

FOREIGN PATENT DOCUMENTS

| | | |
|---|---|---|
| 0092141 | 10/1983 | European Pat. Off. . |
| 1281836 | 10/1968 | Germany . |
| 0259633 | 10/1990 | Japan ................... 353/103 |

*Primary Examiner*—William A. Cuchlinski, Jr.
*Assistant Examiner*—William C. Dowling
*Attorney, Agent, or Firm*—Fitzpatrick, Cella, Harper & Scinto

[57] ABSTRACT

An original conveying apparatus includes an original stacker, a separator for separating the stacked originals from an upper side and for supplying the separated originals, a conveyor for conveying the separated originals to pass them through a reading portion and holding the originals in page sequence, a driver for rotating the conveyor normally or reversely, a discharger for returning the original to the original stacker and a controller for controlling the driver, the discharger and the separator so that an original is selected and set on the reading portion.

8 Claims, 7 Drawing Sheets

ORIGINAL CONVEYING APPARATUS

BACKGROUND OF THE INVENTION

1. Field of the Invention

The present invention relates to an original conveying apparatus, and more particularly, to an original conveying apparatus wherein originals separated from an original stack one by one from the uppermost one are held and conveyed by a conveying and holding means in page sequence, and, in particular, the present invention relates to an original conveying apparatus which can be mounted on an overhead projector (OHP) for projecting an image of an original onto a screen.

2. Related Background Art

An example of a conventional original conveying apparatus which can be mounted on an overhead projector (OHP) will be explained with reference to FIG. 7. A convey film 51 and a hold-down film 52 serve to hold and pinch an original therebetween, and these films are elongated transparent films each having a width greater than a width of the original.

The convey film 51 on which the original rests serves to move the original to the left as the film is shifted in a film winding direction. The hold-down film 52 serves to hold down an upper surface of the original against the convey film 51 to prevent the original from curling and damaging. Further, frame marks are formed on an edge portion of the convey film 51 at a predetermined interval. By detecting such frame marks by a frame detection sensor 53, a desired original is positioned on an exposure portion.

One end of the elongated convey film 51 and one end of the elongated hold-down film 52 are attached to a first take-up means 54 so that these films can be wound around the first take-up means. As shown in FIG. 7, the first take-up means is arranged at the right of a reading area of the exposure portion 202 of an OHP apparatus 201 and comprises a first convey roll 54a on which the convey film 51 is wound and a first hold-down roll 54b on which the hold-down film 52 is wound. These rolls are rotatably mounted between front and rear frames. Incidentally, as shown in FIG. 7, a positional relation between the first convey roll 54a and the first hold-down roll 54b is selected so that the first convey roll 54a is disposed below the first hold-down roll 54b.

The other ends of the elongated convey film 51 and hold-down film 52 are attached to a second take-up means 55 so that these films can be wound around the second take-up means. As shown in FIG. 7, the second take-up means is arranged at the left of the reading area of the exposure portion 202 of the OHP apparatus 201 and comprises a second convey roll 55a on which the convey film 51 is wound and a second hold-down roll 55b on which the hold-down film 52 is wound. These rolls are rotatably mounted between the front and rear frames.

A tensioning means serves to tension the convey film 51 and the hold-down film 52 so that these films pinching the original therebetween are closely contacted with the exposure portion (platen glass) 202 of the OHP apparatus 201, and comprises a pair of right side rollers 56a, 56b arranged at the right of the reading area of the exposure portion 202 and a left side roller 56c arranged at the left of the reading area of the exposure portion 202. Further, as shown in FIG. 7, the convey film 51 and the hold-down film 52 pass above the right side lower roller 56a and below the left side roller 56c so that these rollers are tensioned and are closely contacted with the exposure portion 202. Further, the right side upper roller 56b is also rotatably mounted on the front and rear frames and is biased by a spring and the like (not shown) to be urged against the right side lower roller 56a. By passing the convey film 51 and the hold-down film 52 between the pair of right side rollers 56a, 56b, these films 51, 52 are closely contacted with each other.

Further, a remote control receiving portion is provided on an operation panel 57 of the original conveying apparatus so that left and right motors (not shown) can be operated under the remote control. As shown in FIG. 7, a supply tray 58a from which the original is supplied and a movable tray 58b are attached in the proximity of the first take-up means 54, and the movable tray 58b can be retracted as the right side upper roller 56b is rocked. Further, an original detection sensor (not shown) of reflection type for detecting the presence/absence of the original is associated with the supply tray 58a.

Further, as shown in FIG. 7, detecting elements of the frame detection 1 sensor 53 are disposed between the pair of right side rollers 56a, 56b and the first convey roll 54a with the interposition of the convey film 51. The frame detection sensor 53 may be of a permeable type which can detect the light-blocking frame marks formed on the edge portion of the convey film 51. Further, original guides 59a, 59b are fixed to front and rear side plates (not shown) and serve to guide the original between the convey film 51 and the hold-down film 52 when the original wound around the first convey roll 54a or the second convey roll 55a is supplied and to wind the original around the first convey roll 54a or the second convey roll 55a without striking the original against such roll when the original is wound around the first convey roll 54a or the second convey roll 55a together with the convey film 51.

However, in the above-mentioned conventional original conveying apparatus, since, after the originals are set on the supply tray 58a one by one and are wound around the second convey roll 55a together with the convey film 51, the preparation (setting) is effected by winding the convey film 51 with the originals around the first convey roll 54a and then the presentation is started, the following problems arose:

(1) Since the originals are set on the supply tray 58a one by one, if the number of the originals is great, it takes a long time for setting the originals;

(2) Since the presentation cannot be started until the originals are firstly wound around the second convey roll 55a and then are wound around the first convey roll 54a again, the preparation is troublesome; and (3) When the originals are desired to be changed after the originals were set or when the page sequence of the originals is desired to be changed or when additional original(s) are desired to be added between the existing originals, since the originals already set must be collected, it takes a long time for satisfying the request.

SUMMARY OF THE INVENTION

The present invention aims to solve the above-mentioned problems, and an object of the present invention is to improve the utilizing ability of an original conveying apparatus, and more particularly, for example, to provide an original conveying apparatus wherein the utilizing ability thereof is improved by shortening the time required for setting, collecting or changing originals and by facilitating the access to any original during the conveyance.

To achieve the above object, according to the present invention, an original conveying apparatus comprises an original stacking means on which originals are stacked as an original stack, a guide means for feeding out the originals successively from the original stack rested on the original stacking means, a separation and convey means for separating an uppermost original alone from the originals fed by the guide means and for conveying the separated original, an elongated conveying and holding means for holding the original conveyed by the separation and convey means and for conveying the original onto a reading portion, first and second take-up means for winding the conveying and holding means holding the originals in a page sequence thereon in rolls, and a discharge means for conveying the originals wound around the first take-up means in a reverse direction by winding the conveying and holding means around the second take-up means to discharge the originals onto the original stack on the original stacking means in a sequence opposite to the page sequence.

Thus, the originals are fed from the original stack on the original stacking means by the guide means, only the uppermost original is separated from the remaining original(s) by the separation and convey means, and the separated original is conveyed. Then, the original is held by the elongated conveying and holding means and is conveyed to the reading portion. After the reading operation, the originals are wound around the first take-up means together with the conveying and holding means. When the originals are conveyed in the reverse direction, the conveying and holding means is wound around the second take-up means; meanwhile, the originals are discharged onto the original stack on the original stacking means in the sequence opposite to the page sequence by the discharge means.

As mentioned above, according to the present invention, it is possible to reduce the trouble and time required for setting the originals, preparing the presentation and changing the presenters, to convey and collect the originals without disordering the page sequence of the original stack, and to permit easy access to any original during the conveyance, thereby greatly improving the utilizing ability of the original conveying apparatus.

DETAILED DESCRIPTION OF THE PREFERRED EMBODIMENT

Figure 1:
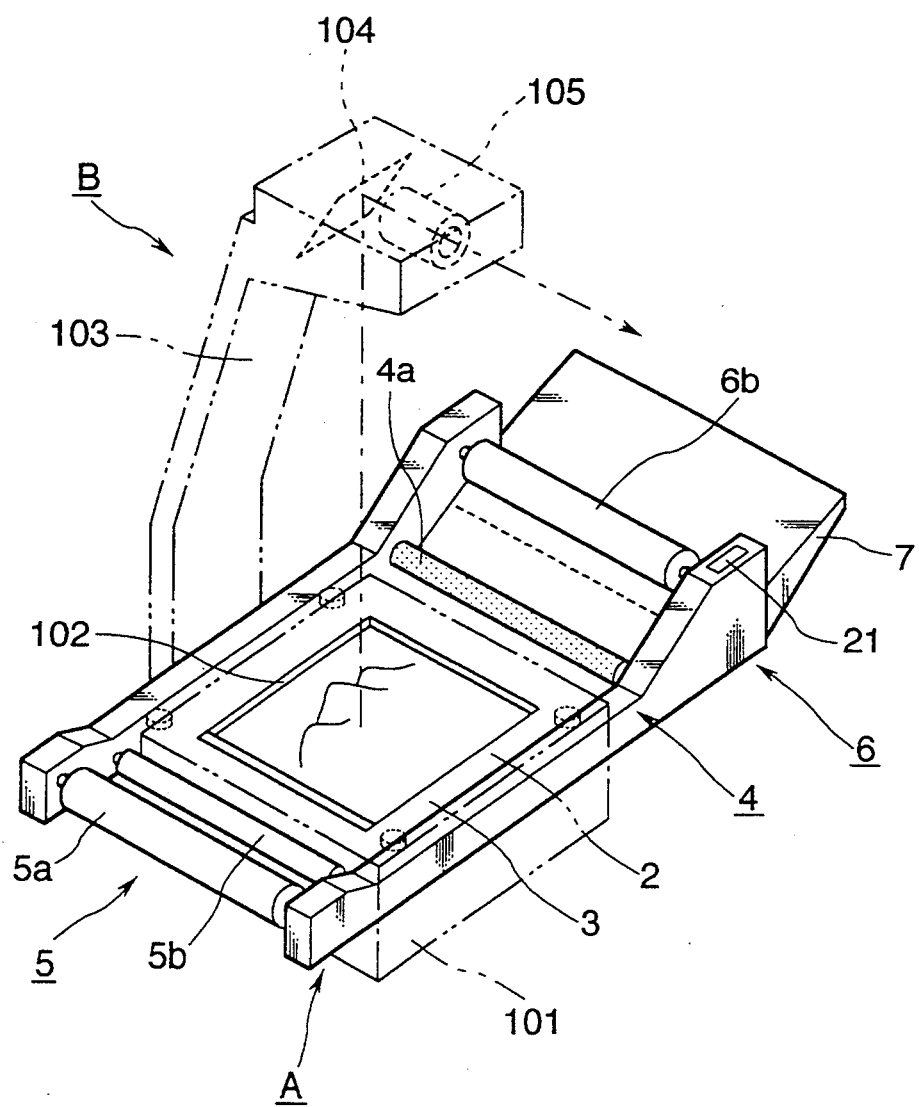
FIG. 1 is a schematic perspective view of an OHP apparatus using an original conveying apparatus according to the present invention.
Figure 2:
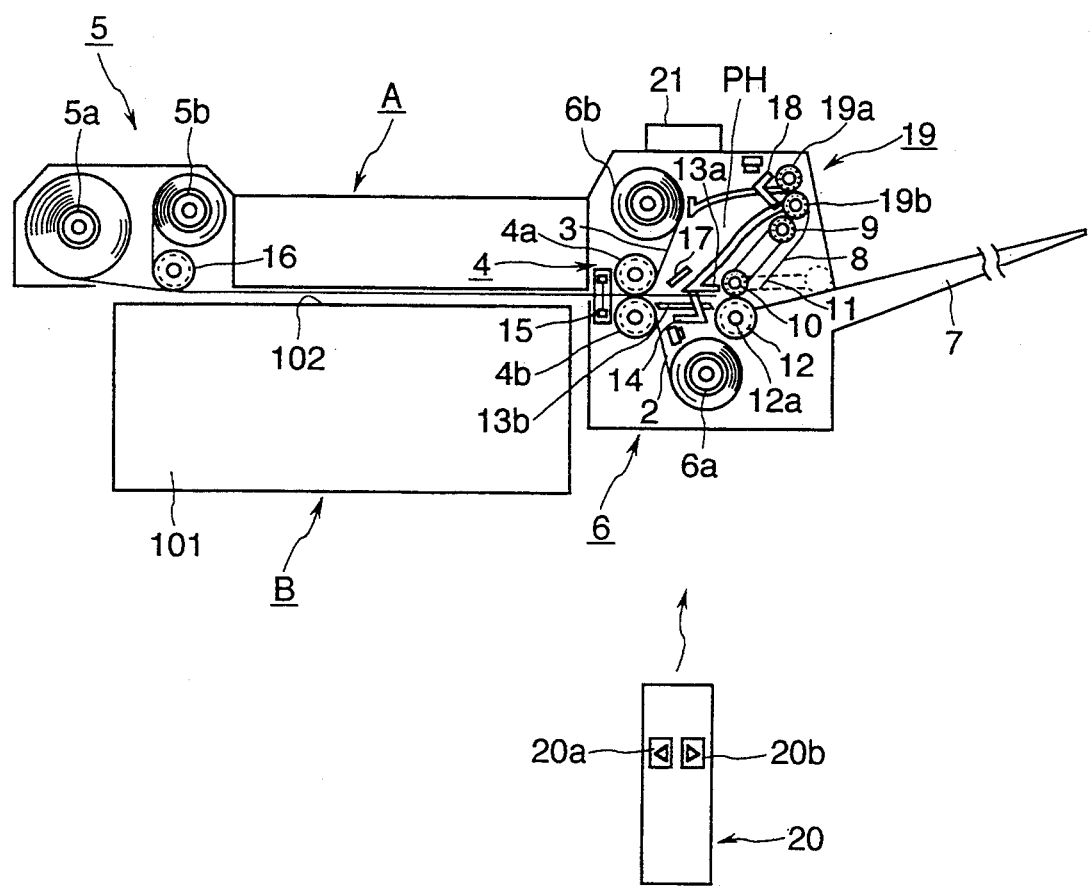
FIG. 2 is a sectional view of the original conveying apparatus.
Figure 3:
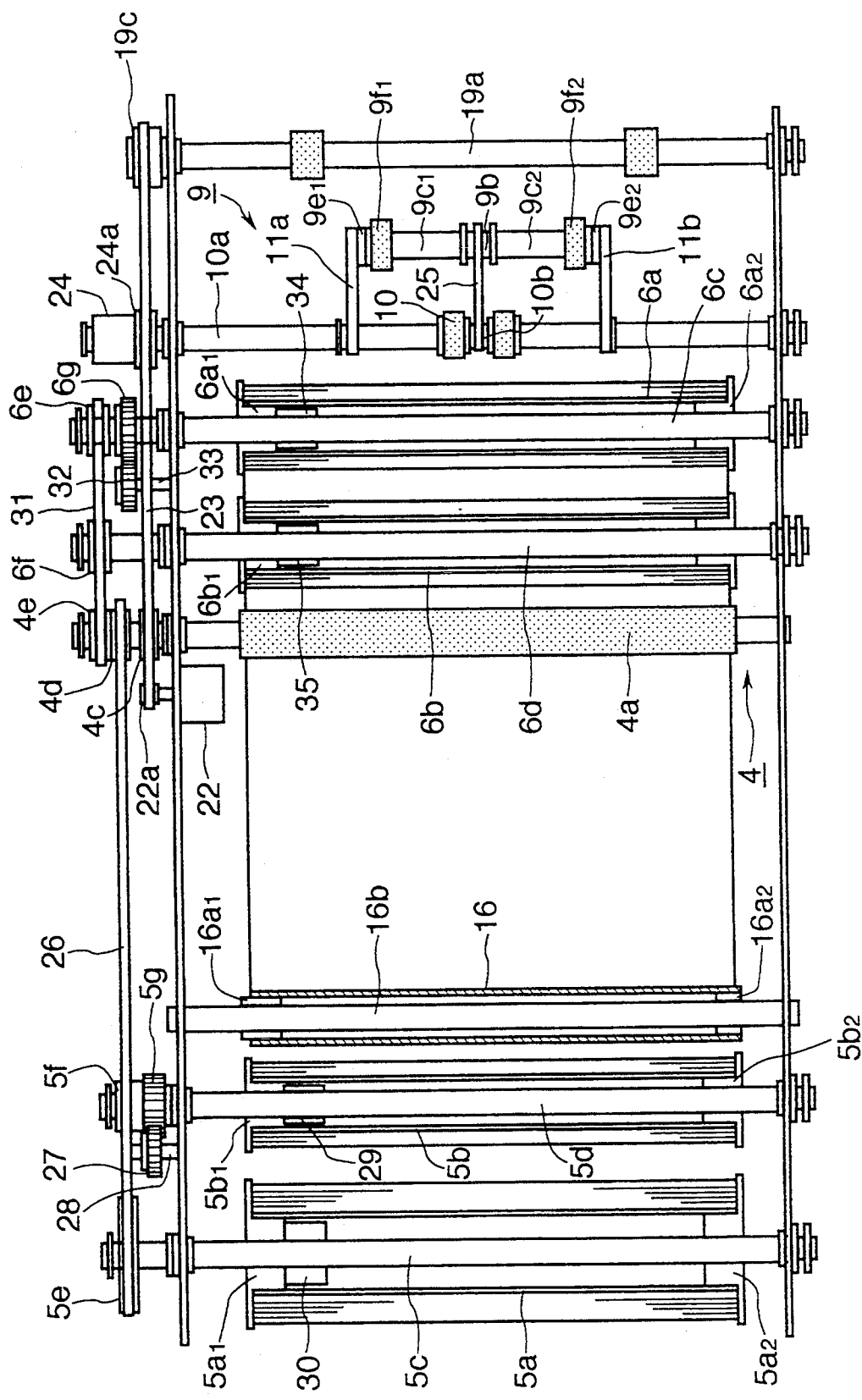
FIG. 3 is a plan view of a drive system of the original conveying apparatus.
Figure 4:
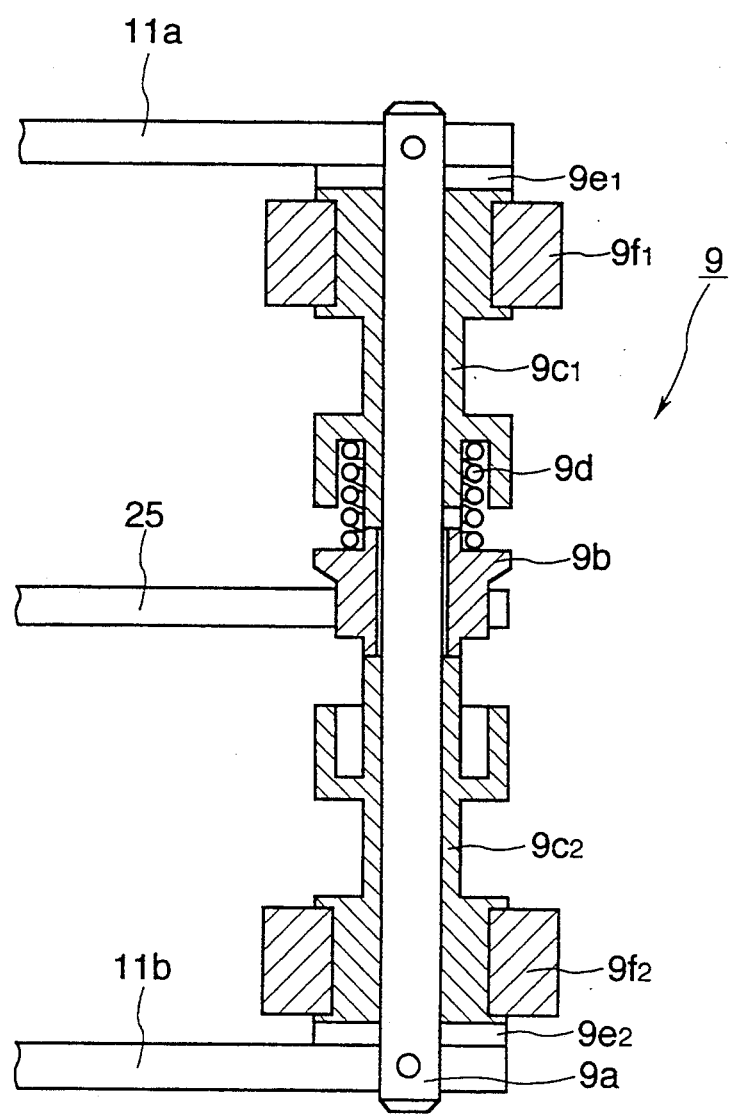
FIG. 4 is a sectional view of a pick-up roller portion of the original conveying apparatus.
Figure 5:
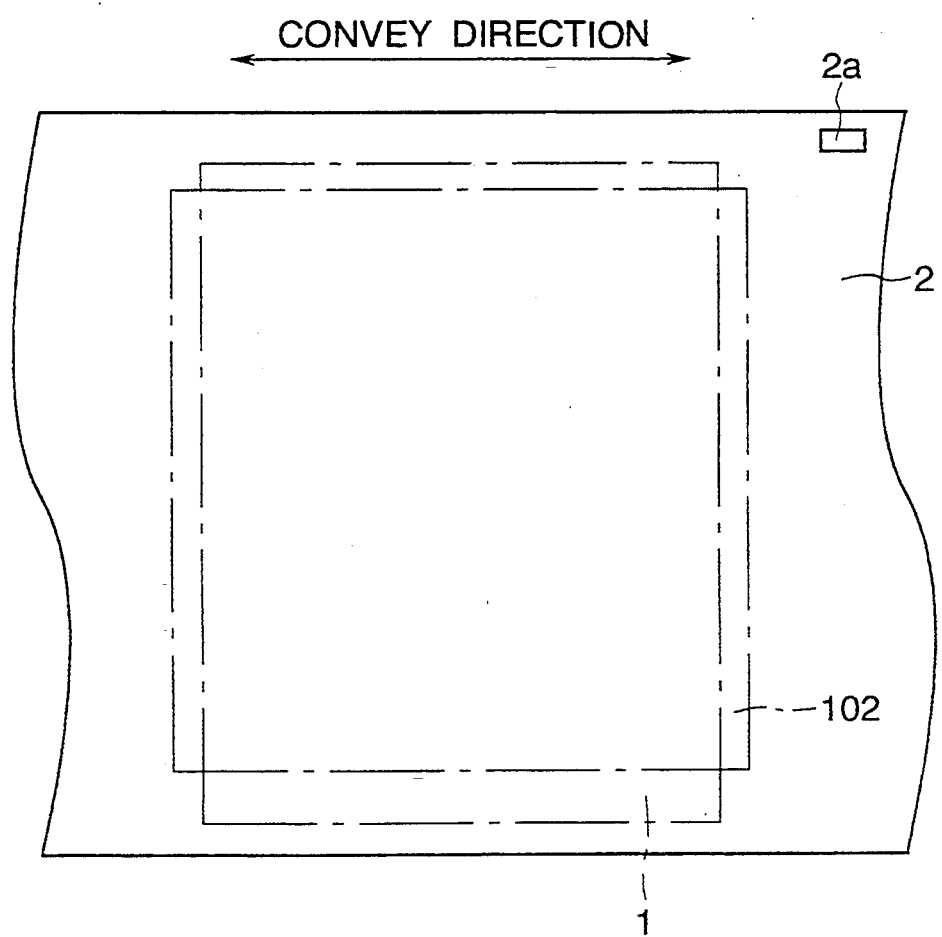
FIG. 5 is a plan view of a portion of a convey film.
Figure 6:
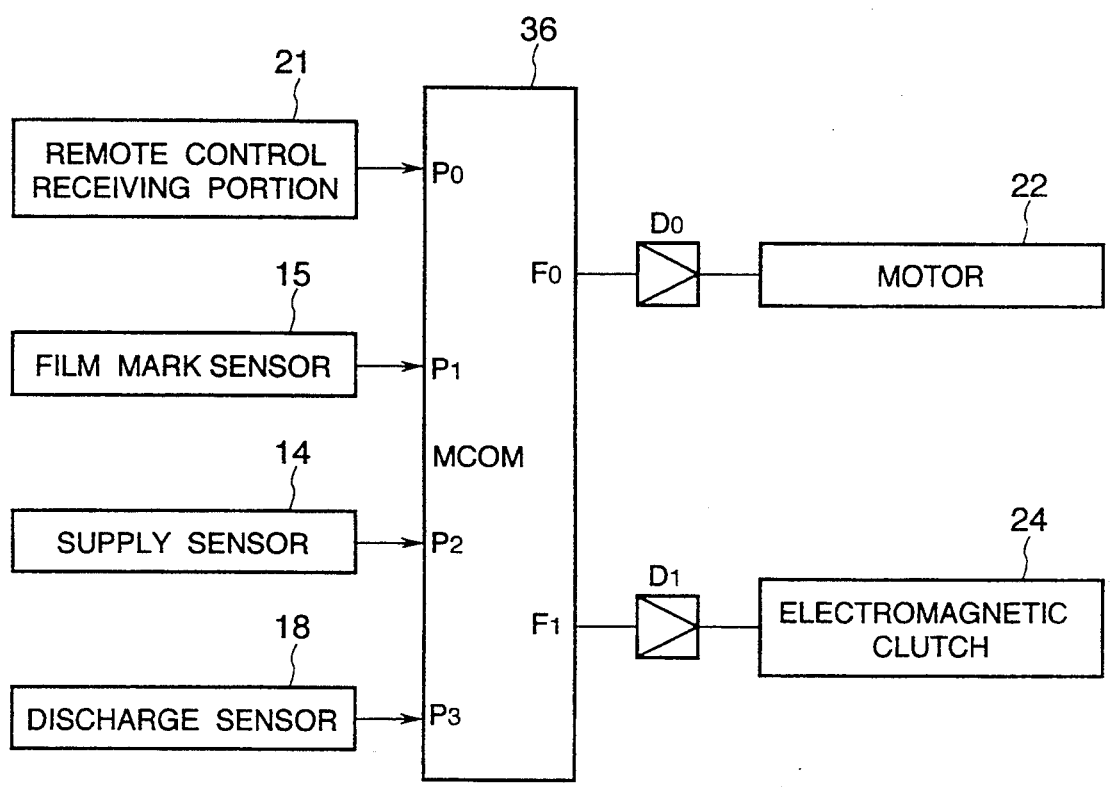
FIG. 6 is a block diagram showing a control system of the original conveying apparatus.
Figure 7:
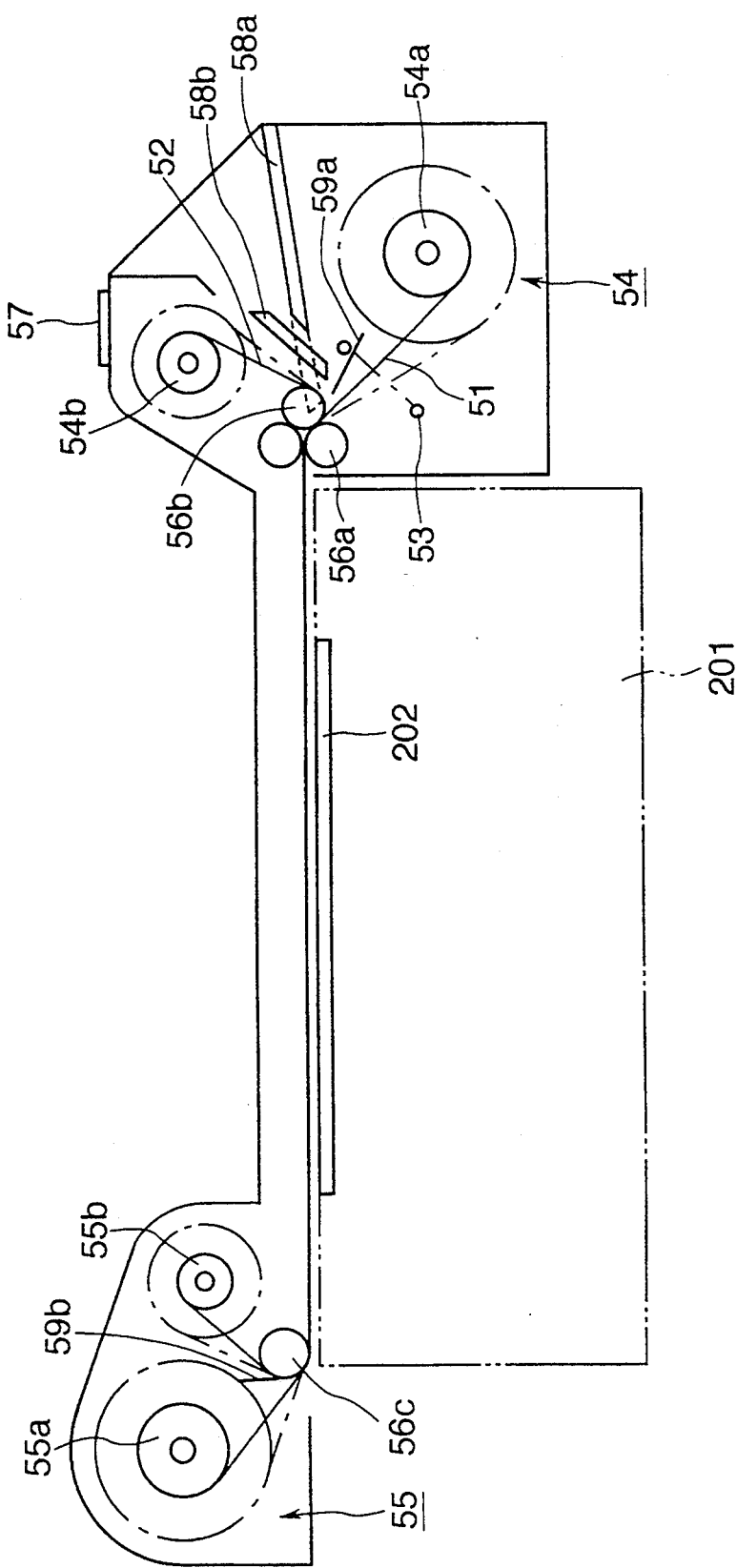
FIG. 7 is a sectional view of a conventional original conveying apparatus.

Now, an original conveying apparatus according to a preferred embodiment of the present invention will be explained with reference to the accompanying drawings. FIG. 1 is a schematic perspective view of an OHP apparatus using the original conveying apparatus, FIG. 2 is a sectional view of the original conveying apparatus, FIG. 3 is a plan view of a drive system of the original conveying apparatus, FIG. 4 is a sectional view of a pick-up roller portion of the original conveying apparatus, FIG. 5 is a plan view of a portion of a convey film, and FIG. 6 is a block diagram showing a control system of the original conveying apparatus. (OHP Apparatus)

First of all, explaining the entire construction of the OHP apparatus B and the original conveying apparatus A according to the present invention with reference to FIG. 1, the original conveying apparatus A is mounted on the OHP apparatus B shown by the two-dot and chain line in FIG. 1 so that OHP originals 1 used in the OHP apparatus B can be automatically supplied. That is to say, the originals 1 separated from an original stack are supplied one by one in a page sequence between a convey film 2 comprised of an elongated transparent film and a hold-down film 3 comprised of an elongated transparent film by a separation and convey mechanism which will be described later, and the films 2, 3 pinching the originals therebetween are conveyed by a film convey means 4 to be closely contacted with an exposure portion 101. The convey film 2 and the hold-down film 3 are wound around a second take-up means 6. By rotating a first take-up means 5, the films 2, 3 are wound around the first take-up means 5. The originals 2 are pinched between the convey film 2 and the hold-down film 3. Each original 1 is conveyed onto a platen glass 102 disposed at the exposure portion 101 of the OHP apparatus B and is illuminated by light from the exposure portion 101. The light passing through the original is focused on a screen (not shown) via a reflection mirror 104 and a lens 105 (projecting means) supported by an arm 103 above the original, thereby projecting an image on the original in an enlarged scale.

Next, various elements of the original conveying apparatus A will be fully explained.

(Separation and Convey Mechanism)

In FIG. 2, the originals are stacked on a supply tray 7 as an original stack. The originals are stacked on the supply tray 7 along a guide member 8 in a page sequence with an imaged surface of each original facing upwardly. A pick-up roller 9 is rotatably supported by a rock arm 11 pivotable around a roller shaft 10a of a supply roller 10. When a supplying operation is started, the rock arm 11 is rotated in a clockwise direction to urge the pick-up roller 9 against the upper surface of the original stack, thereby supplying the originals successively from the uppermost one. The supply roller 10 serves to convey the original supplied from the pick-up roller 9 downstream. A separation roller 12 is urged against the supply roller 10 by a spring (not shown). A one-way clutch is provided on a roller shaft 12a of the separation roller 12 so that only clockwise rotation is transmitted to the separation roller 12. The originals 1 are separated one by one by the supply roller 10 and the separation roller 12 which are rotated in the same direction, and the separated original is guided by an upper supply guide 13a and a lower supply guide 13b until a tip end of the original reaches a nip between a pair of film convey rollers 4a, 4b. A supply sensor 14 serves to detect the tip and trailing ends of the original 1.

(Convey Film and Hold-down Film)

The convey film 2 and the hold-down film 3 serve to hold the originals 1 while pinching the originals therebetween. Each film is formed from an elongated transparent film having a width greater than a width of the original 1. The film is preferably thinner so long as the strength of the film is ensured. Thus, preferably, the film has a thickness of about 25–60 μm. The film is preferably made of material having good light permeability and stable heat resistibility, such as polyethylene terephthalete.

The originals 1 are rested on the convey film 2. The convey film 2 serves to convey the originals 1 as the film is wound around the take-up means 5. On the other hand, the hold-down film 3 serves to urge the originals 1 against the convey film 2, thereby preventing each original 1 from floating due to the curl or the like and preventing the original from damaged.

Further, as shown in FIG. 5, a film end mark 2a is formed on an edge portion of the convey film 2 at its tip end portion. The conveying operation for the original is started from a home position where the film end mark 2a is detected by a film mark sensor 15.

(Film Conveying Portion)

Both ends of the convey film 2 are secured to a first convey roll 5a mounted on the first take-up means 5 and a second convey roll 6a mounted on the second take-up means 6, respectively. The convey film 2 is closely contacted with the hold-down film 3 by a pair of convey rollers 4a, 4b and a tension roller 16. Further, both ends of the hold-down film 3 are secured to a first hold-down roll 5b mounted on the first take-up means 5 and a second hold-down roll 6b mounted on the second take-up means 6, respectively. Similarly, the hold-down film 3 is closely contacted with the convey film 2 by the pair of convey rollers 4a, 4b and the tension roller 16.

The pair of convey rollers 4a, 4b comprises an upper film convey roller 4a and a lower film convey roller 4b which are contacted with each other with pressure of 1–2 kgf and serve to control the conveyance of the convey film 2 and the hold-down film 3 to remove the separated original from the pair of separation roller 12 and supply roller 10 to convey the original between the convey film 2 and the hold-down film 3.

(First Take-up Means)

The first take-up (wind-up) means 5 serves to wind the convey film 2 and the hold-down film 3 thereon from one end thereof, and, as shown in FIG. 1, it is arranged out of a reading area of the exposure portion 101 of the OHP apparatus B. In the illustrated embodiment, as shown in FIGS. 2 and 3, the first take-up means is arranged at the left of the reading area of the exposure portion 101 and includes the first convey roller 5a on which the convey film 2 is wound and the first hold-down roll 5b on Which the hold-down film 3 is wound, which rolls are rotatably supported by front and rear frames. That is to say, as shown in FIG. 3, flanges $5a_1$, $5a_2$ each having a side regulating member for regulating the offset of the convey film 2 are fitted into both end openings of the first convey roll 5a, and such flanges $5a_1$, $5a_2$ are rotatably mounted on a first convey roll shaft 5c. One end of the convey film 2 is secured to an outer surface of the first convey roll 5a by an adhesive tape, for example, so that the convey film 2 is wound around the first convey roll 5a when the convey roller is rotated.

Further, flanges $5b_1$, $5b_2$ each having a side regulating member for regulating the offset of the hold-down film 3 are fitted into both end openings of the first hold-down roll 5b, and such flanges $5b_1$, $5b_2$ are rotatably mounted on a first hold-down roll shaft 5d. One end of the hold-down film 3 is secured to an outer surface of the first hold-down roll 5b by an adhesive tape, for example, so that the hold-down film 3 is wound around the first hold-down roll 5b when the latter is rotated.

(Second Take-up Means)

The second take-up (wind-up) means 6 serves to wind the elongated convey film 2 and the hold-down film 3 thereon from the other end thereof, and as shown in FIG. 1, it is arranged out of the reading area of the exposure portion 101 of the OHP apparatus B. In the illustrated embodiment, as shown in FIGS. 2 and 3, the second take-up means is arranged at the right of the reading area of the exposure portion 101 and includes the second convey roller 6a on which the convey film 2 is wound and the second hold-down roll 6b on which the hold-down film 3 is wound, which rolls That is to say, as shown in FIG. 3, flanges $6a_1$, $6a_2$ are rotatably supported by the front and rear frames each having a side regulating member for regulating the offset of the convey film 2 are fitted into both end openings of the second convey roll 6a, and such flanges $6a_1$, $6a_2$ are rotatably mounted on a second convey roll shaft 6c. The other end of the convey film 2 is secured to an outer surface of the second convey roll 6a by an adhesive tape, for example, so that the convey film 2 is wound around the second convey roll 6a when the convey roll is rotated.

Further, flanges $6b_1$, $6b_2$ each having a side regulating member for regulating the offset of the hold-down film 3 are fitted into both end openings of the second hold-down roll 6b, and such flanges $6b_1$, $6b_2$ are rotatably mounted on a second hold-down roll shaft 6d. The other end of the hold-down film 3 is secured to an outer surface .of the second hold-down roll 6b by an adhesive tape, for example, so that the hold-down film 3 is wound around the second hold-down roll 6b when the hold-down roll is rotated.

(Tension Means)

The tension roller 16 and the pair of film convey rollers 4a, 4b serve to tension the convey film 2 and the hold-down tape 3 pinching the originals 1 therebetween so that these films are positioned on the platen glass 102 of the OHP apparatus while closely contacting with each other. In the illustrated embodiment, as shown in FIGS. 2 and 3, the tension roller 16 is disposed at the left of the reading area of the exposure portion 101, and the pair of film convey rollers 4a, 4b are disposed at the right of the reading area of the exposure portion 101.

The tension roller 16 is formed from a hollow pipe member and flanges $16b_1$, $16b_2$ are fitted into both end openings of the pipe member. Such flanges $16b_1$, $16b_2$ are rotatably mounted on a tension roller shaft 16b, both ends of which are secured to flanges by screws and the like. As shown in FIG. 2, the hold-down film 3 is urged against an outer surface of the tension roller 16, and the convey film 2 is further urged against the outer surface of the tension roller with the interposition of the holeddown film, so that the films are closely contacted with each other. When the convey film 2 and the hold-down film 3 are shifted to the left or right, the tension roller 16 is rotatingly driven by the shifting movement of the films, thereby preventing scratching of the films.

(Discharge Means)

In FIG. 2, a dip Myler sheet 17 has a tip end penetrating into a conveying path so that, when the original is supplied from thee right, the original can advance while pushing the dip sheet 17 upwardly. When a tip end of the original passes through the nip between the pair of film convey rollers 4a, 4b while the original 1 pinched between the convey film 2 and the hold-down film 3 is being conveyed to the right, the tip end of the original 1 is lifted upwardly by the dip Myler sheet 17 to be guided to a discharge path. When the convey film 2 and the hold-down film 3 are further shifted to the right, the tip end of the original 1 is detected by a discharge sensor 18, with the result that a pair of discharge rollers 19 are rotated to discharge the-original 1 onto the supply tray 7. The pair of discharge rollers 19 comprises a discharge roller 19a to which a driving force is transmitted, and a driven discharge roller 19b urged against the discharge roller 19a with light pressure.

(Remote Control)

In FIG. 2, a remote controller 20 has an advance button 20a and a retard button 20b. A remote control receiving portion 21 serves to remotely control the energization and deenergization of the original conveying apparatus A in response to a signal emitted from the remote controller 20.

(Drive System)

Next, a drive system of the original conveying apparatus A will be explained with reference to FIG. 3. A drive motor 22 acts as a drive source for driving the entire original conveying apparatus A and comprises a stepping motor. A pulley 22a is secured to an output shaft of the motor 22. An endless timing belt 23 is wound around the pulley 22a and is also wound around a pulley 24a connected to an electromagnetic clutch 24 attached to one end of the supply roller shaft 10a, a pulley 19c attached to one end of a roller shaft of the discharge roller 19a and a pulley 4c attached to one end of a roller shaft of the upper film convey roller 4a to transmit the driving force.

The supply roller 10 and the pick-up roller 12 are driven as follows. When the motor 22 is activated, the driving force of the motor is transmitted to the pulley 24a connected to the electromagnetic clutch 24 via the timing belt 23. In this case, when the electromagnetic clutch 24 is turned ON, the driving force is transmitted to the supply roller shaft 10a, with the result that the supply roller 10 secured to the supply roller shaft 10a is rotated. The separation roller 12 is urged against the supply roller 10 with a force of about 200–300 grams. As mentioned above, the one-way clutch is provided on the separation roller shaft 12a, so that, when the original 1 is supplied, i.e. when the supply roller 10 is rotated in the clockwise direction (FIG. 2), the driving force is transmitted to the separation roller, thereby rotating the separation roller 12 in the same clockwise direction. Further, when the original is discharged, i.e. when the supply roller 10 is rotated in an anti-clockwise direction (FIG. 2), the driving force is not transmitted to the separation roller, with the result that the separation roller 12 is rotated by the rotation of the supply roller 10.

The coefficient of friction $\mu$ of the supply roller 10 is selected to be greater than that of the separation roller 12 so that, if plural originals are supplied by the supply roller 10, since the braking force is applied from the separation roller 12, the uppermost original 1 alone can be supplied. Incidentally, since such an arrangement is already known, detailed explanation thereof will be omitted.

Next, the driving of the pick-up roller 9 will be explained with reference to FIGS. 3 and 4. In FIG. 3, a pulley 10b is attached to the supply roller shaft 10a, and a pulley 9b is attached to the pick-up roller shaft 9a. An endless timing belt 25 is wound around and extends between the pulleys 10b, 9b. Thus, when the supply roller 10 is rotated, the driving force is transmitted to the pick-up roller 9 via the timing belt 25.

Further, as shown in FIG. 4, both ends of the pick-up roller shaft 9a are secured to rock arms 11a, 11b, and the pulley 9b is rotatably mounted on the pick-up roller shaft 9a. Projections for transmitting a rotational force are formed on both side surfaces of the pulley 9b and are engaged by projections of pick-up roller cores $9c_1$, $9c_2$. Further, a compression spring 9d is arranged between the pick-up roller core $9c_1$ and the pulley 9c so that the pick-up roller cores $9c_1$, $9c_2$ are urged against the rock arms 11a, 11b via friction pieces $9e_1$, $9e_2$ by the compression spring. Further, pick-up rubber rollers $9f_1$, $9f_2$ are attached to peripheral surfaces of the pick-up roller cores $9c_1$, $9c_2$, thereby applying a conveying force to the original 1.

That is to say, when the supply roller 10 is rotated, the driving force is transmitted to the pulley 9b through the timing belt 25 and then is transmitted to the rock arms 11a, 11b through the friction pieces $9e_1$, $9e_2$. in this case, since the rock arms 11a, 11b can be rotated around the supply roller shaft 10a, the rock arms 11a, 11b are rotated around the supply roller shaft 10a, thereby rocking the pick-up roller 9 itself. For example, when the original is supplied, the supply roller 10 is rotated in the clockwise direction (FIG. 2), thereby rotating the pick-up roller 9 in the clockwise direction via the timing belt 25 and, at the same time, the rock arms 11a, 11b are rotated around the supply roller shaft 10a in the clockwise direction due to the friction between the rock arms and the pick-up roller cores, thereby resting the pick-up roller on the original stack to urge the original stack. When the pick-up roller 9 is further rotated, the conveying force for conveying the original 1 can be obtained due to the friction between the pick-up roller and the original.

Then, in FIG. 3, the rotational force of the motor 22 is transmitted to the pulley 4c. Since the pulley 4c is secured to the upper film convey roller 4a, the upper film convey roller 4a is rotated. Since the lower film convey roller 4b is urged against the upper film convey roller 4a, the rotational force of the upper film convey roller 4a is transmitted to the lower film convey roller 4b via the convey film 2 and the hold-down film 3, thereby rotating the roller 4b. Further, in FIG. 3, the rotational force of the motor 22 is transmitted to the pulley 19c through the timing belt 23. Since the pulley 19c is secured to one end of the roller shaft of the discharge roller 19a, the discharge roller 19a is rotated. Further, since the discharge roller 19b is urged against the discharge roller 19a, the conveying force for conveying the original 1 is created in the pair of discharge rollers 19.

Two pulleys 4d, 4e are attached to the roller shaft of the upper film convey roller 4a as well as the pulley 4c, and one-way clutches are incorporated into the pulleys 4d, 4e, respectively. An endless timing belt 26 is wound around a peripheral surface of the pulley 4d and is also wound around a pulley 5e secured to one end of a first convey roll shaft 5c and a pulley 5f secured to one end of a first hold-down roll shaft 5d.

A gear 5g is secured to the first hold-down roll shaft 5d and is meshed with a one-way gear 27. The one-way gear 27 is attached to a caulking shaft 28 secured to a frame. When the gear 5g is rotated in an anti-clockwise direction (FIG. 3), the one-way gear 27 is locked to the caulking shaft 28. Further, as shown in FIG. 3, a torque limiter 29 is attached to the first hold-down roll shaft 5d, and the rotation of the pulley 5f is transmitted from the first hold-down roll shaft 5d to the flange $5b_1$ through the torque limiter 29, thereby rotating the first hold-down roll 5b fitted on the flange $5b_1$ to wind the hold-down film 3.

On the other hand, as shown in FIG. 3, a torque limiter 30 is attached to the first convey roll shaft 5c, and the rotation of the pulley 5e is transmitted from the first convey roll shaft 5c to the flange $5a_1$ through the torque limiter 30, thereby rotating the first convey roll 5a fitted on the flange $5a_1$ to wind the convey film 2. Further, an endless timing belt 31 wound around a peripheral surface of the pulley 4e and is also wound around a pulley 6e secured to one end of a second convey roll shaft 6c and a pulley 6f secured to one end of a second hold-down roll shaft 6d.

A gear 6g is secured to the second convey roll shaft 6c and is meshed with a one-way gear 32. The one-way gear 32 is attached to a caulking shaft 33 secured to the frame. When the gear 6g is rotated in a clockwise direction (FIG. 3), the one-way gear 32 is locked to the caulking shaft 33. Further, as shown in FIG. 3, a torque limiter 34 is attached to the second convey roll shaft 6c, and the rotation of the pulley 6e is transmitted from the second convey roll shaft 6c to the flange $6a_1$ through the torque limiter 34, thereby rotating the second convey roll 6a fitted on the flange $6a_1$ to wind the convey film 2.

On the other hand, as shown in FIG. 3., a torque limiter 35 is attached to the second hold-down roll shaft 6d, and the rotation of the pulley 6f is transmitted from the second hold-down roll shaft 6d to the flange $6b_1$ through the torque limiter 35, thereby rotating the second hold-down roll 6b fitted on the flange $6b_1$ to wind the hold-down film 3.

(Film Conveying Operation)

First of all, a conveying operation for the convey film 2 and the hold-down film 3 when the original 1 separated from the supply tray 7 is conveyed onto the platen glass 102 will be explained.

In FIG. 3, when the motor 22 is rotated in the clockwise direction, the driving force of the motor is transmitted to the pulley 4c through the timing belt 23. Since the pulley 4c is secured to the upper film convey roller 4a, the upper film convey roller 4a is rotated in the clockwise direction. Since the lower film convey roller 4b is urged against the upper film convey roller 4a, the pair of film convey rollers 4 advance the original 1 while pinching the original therebetween.

When the upper film convey roller 4a is rotated in the clockwise direction, the one-way clutch in the pulley 4d is locked to rotate this pulley, thereby rotating the pulleys 5f, 5e via the timing belt 26. The number of teeth of the pulleys 4d, 5f, 5e is selected so that the conveying speeds of the hold-down film 3 wound around the first hold-down roll 5b and the convey film 2 wound around the first convey roll 5a are always slower than the conveying speeds of the hold-down film 3 and the convey film 2 at the pair of film convey rollers 4. Further, since the hold-down film 3 and the convey film 2 are pulled through the torque limiters 29, 30 respectively, the original 1 on the platen glass 102 is conveyed without wrinkle. Further, when the upper film convey roller 4a is rotated in the clockwise direction, the one-way clutch is not locked so that the pulley 4e is rotated freely.

By rotating the first hold-down roll 5b and the first convey roll 5a, the hold-down film 3 and the convey film 2 are conveyed to the left in FIG. 2. In this case, although the second hold-down roll 6b and the second convey roll 6a are rotated in clockwise directions, respectively, since the one-way gear 32 meshed with the gear 6g secured to the second convey roll shaft 6c is locked to the caulking shaft 33, the second convey roll shaft 6c is fixed. In this case, the second convey roll shaft 6c slips with respect to the flange $6a_1$ due to the presence of the torque limiter 34. As a result, the back tension is applied to the convey film 2, thereby conveying the convey film 2 without wrinkle Further, as mentioned above, since the second convey roll shaft 6c is fixed, the pulley 6e secured to the second convey roll shaft 6c is also fixed. Thus, since the timing belt 31 wound around the pulley 6e is fixed, the pulley 6f is also fixed or stopped. Since the pulley 6f is secured to the second hold-down roll shaft 6d, the second hold-down roll shaft 6d slips with respect to the flange $6b_1$ due to the presence of the torque limiter 35. As a result, the back tension is applied to the hold-down film 3, thereby conveying the hold-down film 3 without wrinkle.

Next, a conveying operation for the convey film 2 and the hold-down film 3 when the original 1 is discharged from the platen glass 102 onto the supply tray 7 will be explained.

In FIG. 3, when the motor 22 is rotated in the anti-clockwise direction, the upper film convey roller 4a is rotated in the anti-clockwise direction, thereby locking the one-way clutch in the pulley 43 to rotate this pulley. As a result, the pulleys 6f, 6e are rotated via the timing belt 31. The number of teeth of the pulleys 4e, 6f, 6e is selected so that the conveying speeds of the hold-down film 3 wound around the second hold-down roll 6b and the convey film 2 wound around the second convey roll 6a are always faster than the conveying speeds of the hold-down film 3 and the convey film 2 at the pair of film convey rollers 4. Further, since the hold-down film 3 and the convey film 2 are pulled through the torque limiters 34, 35, respectively, the original 1 on the platen glass 102 is conveyed without wrinkle. Further, when the upper film convey roller 4a is rotated in the anti-clockwise direction, the one-way clutch is not locked so that the pulley 4d is rotated freely.

By rotating the second hold-down roll 6b and the second convey roll 6a, the hold-down film 3 and the convey film 2 are conveyed to the right in FIG. 2. In this case, although the first hold-down roll 5b and the first convey roll 5a are rotated in anti-clockwise directions, respectively, since the one-way gear 27 meshed with the gear 5g secured to the first hold-down roll shaft 5d is locked to the caulking shaft 27, the first hold-down roll shaft 5d is fixed. In this case, the first hold-down roll shaft 5d slips with respect to the flange $5b_1$ due to the presence of the torque limiter 29. As a result, the back tension is applied to the hold-down film 3, thereby conveying the hold-down film 3 without wrinkle.

Further, as mentioned above, since the first hold-down roll shaft 5d is fixed, the pulley 5f secured to the first hold-down roll shaft 5d is also fixed. Thus, since the timing belt 26 wound around the pulley 5f is fixed, the pulley 5e is also fixed or stopped. Since the pulley 5e is secured to the first convey roll shaft 5c, the first convey roll shaft 5c slips with respect to the flange $5a_1$ due to the presence of the torque limiter 30. As a result, the back tension is applied to the convey film 2, thereby conveying the convey film 2 without wrinkle.

(Control Portion)

Next, the control portion of the original conveying apparatus A will be explained with reference to a block diagram shown in FIG. 6.

In FIG. 6, the controlling operation for the original conveying apparatus A is effected mainly under the action of a conventional one-chip microcomputer (referred to as "MCOM" hereinafter) 36 including a ROM, a RAM and the like. Input signals from the remote control receiving portion 21 for receiving the signal from the remote controller 20, the film mark sensor 15 for detecting the film end mark 2a formed on the convey film 2, and the discharge sensor 18 for detecting the supplied original are inputted to input ports $P_0$–$P_3$ of the MCOM 36.

Further, output signals for effecting ON/OFF operation of the motor 22 acting as the drive source for driving the various rollers required for conveying the original 1, convey film 2 and hold-down film 3 and ON/OFF operation of the electromagnetic clutch 24 for controlling a distance between the originals 1 to be supplied are outputted from output ports $F_0$, $F_1$ of the MCOM 36.

Incidentally, the read-in of the above-mentioned input signals and ON/OFF operations are effected on the basis of programs stored in the ROM of the MCOM 36.

(Home Position Determining Mechanism for Convey Film)

In FIG. 2, the film mark sensor 15 comprises a photo-sensor and is secured to the frame. The film mark sensor 15 is disposed at a position corresponding to the end of the convey film 2. When the film end mark 2a formed on the convey film 2 is shifted, since the film end mark 2a has the light blocking ability, the sensor 15 can detect the film end mark. The film end mark 2a is positioned at the foremost end of the convey film 2 which can be conveyed. After a power source of the original conveying apparatus is turned ON, the home position of the convey film is determined on the basis of the position of the film end mark 2a.

(Original Conveying Operation)

Next, the original conveying operation effected by the original conveying apparatus A will be explained with reference to FIG. 2.

First of all, the original stack is rested on the supply tray 7 in such a manner that a tip end of the original stack is abutted against the separation roller 12. When the advance button 20a of the remote controller 20 is depressed, the motor 22 is rotated in the clockwise direction to rotate the upper film convey roller 5a in the clockwise direction, thereby conveying the convey film 2 and the hold-down film 3 to the left in FIG. 2. The first convey roll 5a and the first hold-down roll 5b are rotated at high speeds while slipping, thereby winding the convey film 2 and the hold-down film 3.

Then, the electromagnetic clutch 24 is activated to rotate the supply roller 10 in the clockwise direction. At the same time, the pick-up roller 9 is rotated in the clockwise direction to rotate the rock arms 11a, 11b around the supply roller shaft 10a in the clockwise direction, thereby urging the pick-up roller 9 against the original stack. In this case, the originals are successively fed to the nip between the supply roller 10 and the separation roller 12 from the uppermost one. Since the coefficient of friction $\mu$ between the supply roller 10 and the original (OHP sheet) is greater than the coefficient of friction $\mu$ between the separation roller 12 and the original 1, if two originals 1 enter into the nip, the upper original alone can be supplied.

Next, when a predetermined time is elapsed after the tip end of the original 1 was detected by the supply sensor 14, the original 1 is pinched between the pair of film convey rollers 4. Thereafter, the original 1 is pinched between the convey film 2 and the hold-down film 3 and is conveyed by about 50 mm. Then, the electromagnetic clutch 24 is turned OFF. Since the conveying force of the pair of film convey rollers 4 for conveying the original 1 is greater than the conveying force obtained by the separation and convey portion, after the electromagnetic clutch 24 is turned OFF, the original 1 is conveyed only by the pair of film convey rollers 4 and the supply roller 10 and the separation roller 12 are rotatingly driven freely, with the result that the original 1 is pulled from the nip between the rollers 10, 12.

Immediately after the trailing end of the original 1 passes through the supply sensor 14, the length of the original 1 is firstly measured. That is to say, the shifted distance is calculated by counting the steps applied to the motor 22 between ON and OFF of the supply sensor 14, thereby ascertaining the length of the original 1. A value corresponding to a half of the length of the original 1 is a length from the trailing end of the original to a center of the original. Thus, the motor 22 is activated so that the center of the original coincides with a center of the reading area of the exposure portion 101 of the OHP apparatus B, and then the motor is stopped.

Then, when the advance button 20a of the remote controller 20 is depressed, the next original 1 is set on the platen glass 102 of the OHP apparatus B by the aforementioned operation. When the originals are supplied successively, the same operations are repeated.

Next, a conveying operation when the original is returned will be explained.

When the retard button 20b of the remote controller 20 is depressed, the motor 22 is rotated in the anti-clockwise direction to rotate the upper film convey roller 4a in the anti-clockwise direction, thereby conveying the convey film 2 and the hold-down film 3 to the right in FIG. 2. Then, the second convey roll 6a and the second hold-down roll 6a are rotated at high speeds while slipping, thereby winding the convey film 2 and the hold-down film 3.

Then, the electromagnetic clutch 24 is activated to rotate the supply roller 10 in the anti-clockwise direction. At the same time, the pick-up roller 9 is rotated in the anti-clockwise direction to rotate the rock arms 11a, 11b around the supply roller shaft 10a in the anti-clockwise direction, thereby retarding the pick-up roller 9 from the supply tray 7. The original 1 is shifted to the right in FIG. 2. When the original passes through the nip between the pair of film convey rollers 4, the tip end of the original 1 is dipped by the dip Myler sheet 17 to be directed to the discharge path PH. When the tip end of the original 1 is detected by the discharge sensor 18, the pair of discharge rollers 19 are operated, with the result that the original 1 is pinched and conveyed by the pair of discharge rollers 19.

After the discharge sensor 18 is turned ON, the motor 22 is activated to convey the original 1 by a predetermined amount so that the center of the next original is aligned with the center of the reading area of the exposure portion 101 of the OHP apparatus B, and then the motor is stopped. In this case, the original 1 is discharged onto the supply tray 7. the original 1 is switch-backed on the tray 7 to be dropped toward the rollers 10, 12.

Further, when the next page is desired to be projected, the films are further conveyed to the right to discharge the preceding original onto the supply tray 7. When the discharged original is desired to be projected, by depressing the advance button 20a, the original in question is supplied from the supply tray 7.

By the above-mentioned operation, since the originals can be stacked on the supply tray 7 with the imaged surfaces thereof facing upwardly while maintaining the page sequence, even when the originals are advanced or returned, the sequential access can be achieved without disordering the page sequence.

With the arrangement as mentioned above, since the presenter can start the presentation only by setting the originals on the supply tray 7 in page sequence and manipulating the remote controller 20, the setting of the originals and the preparation of the presentation can be effected promptly. Further, since the originals 1 are supplied in page sequence and the access to the any original can be easily achieved, when the used original 1 is desired to be used again or when a desired original 1 is sought, it is possible to smoothly access to the desired original.

Further, when a next presenter is scheduled to make a presentation, since the used originals 1 can be discharged onto the supply tray 7 and be collected, the next presenter can easily prepare his presentation in a very short time simply by setting the originals on the supply tray 7. In addition, since the originals 1 are discharged onto the supply tray 7 in page sequence, re-arranging of the originals is not necessary.

Furthermore, when an additional original is desired to be inserted between the originals 1 during the presentation, the additional original can be inserted between the originals stacked on the supply tray 7.

What is claimed is:

1. An original conveying apparatus comprising:
   original stacking means on which originals are stacked;
   separation means for separating the stacked originals from an upper side and for supplying the separated originals;
   convey means for conveying the separated originals to pass through a reading portion successively and holding the separated originals in a page sequence;
   drive means for rotating said convey means normally or reversely;
   discharge means for returning the originals conveyed by the reverse rotation of said convey means to said original stacking means; and
   control means for controlling said drive means, said discharge means and said separation means, said control means operating to select one of an original among the held originals and the originals stacked on said original stacking means to set the selected original on said reading portion.

2. An original conveying apparatus according to claim 1, wherein said convey means includes an elongated conveying and holding means for holding the original separated and supplied by said separation means and conveying the original onto said reading portion, and wind-up means for winding thereon said conveying and holding means holding the originals in page sequence in a rolled state.

3. An original conveying apparatus according to claim 2, wherein said conveying and holding means comprises elongated film members having good permeability.

4. An overhead projector comprising:
   an original conveying apparatus comprising original stacking means on which originals are stacked, separation means for separating the stacked originals from an upper side and for supplying the separated originals, convey means for conveying the separated originals to pass through a reading portion successively and holding the separated originals in a page sequence, drive means for rotating said convey means normally or reversely, discharge means for returning the originals conveyed by the reverse rotation of said convey means to said original stacking means, and control means for controlling said drive means, said discharge means and said separation means, said control means operating to select one of an original among the held originals and the originals stacked on said original stacking means to set the selected original on said reading portion; and
   projecting means for projecting an image read from the original conveyed to said reading portion by said original conveying apparatus onto a screen.

5. An original conveying apparatus comprising:
   original stacking means on which originals are stacked;
   separation and convey means for separating the stacked originals from an upper side and conveying the separated originals;
   elongated conveying and holding means for holding the originals separated and conveyed by said separation and convey means and conveying the originals to a reading portion;
   first and second wind-up means for winding thereon said conveying and holding means holding the originals in page sequence in rolled state; and
   discharge means for conveying the originals wound on said first wind-up means reversely by winding said conveying and holding means onto said second wind-up means, thereby discharging the originals onto the originals stacked on said original stacking means.

6. An original conveying apparatus according to claim 5, wherein said conveying and holding means comprises elongated film members having good permeability.

7. An original conveying apparatus according to claim 5, further comprising control means for effecting control in such a manner that, after an original separated from the originals stacked on said original stacking means is discharged onto the originals stacked on said original stacking means by said discharge means, the original is fed out by said separation and convey means to be conveyed to said reading portion again.

8. An overhead projector comprising:
said original conveying apparatus according to claim 5; and
projecting means for projecting an image read from the original conveyed to said reading portion by said original conveying apparatus onto a screen.

* * * * *

UNITED STATES PATENT AND TRADEMARK OFFICE
CERTIFICATE OF CORRECTION

PATENT NO. : 5,446,511
DATED : August 29, 1995
INVENTOR(S) : Yoshihiko KITAHARA, et al.

It is certified that error appears in the above-indentified patent and that said Letters Patent is hereby corrected as shown below:

TITLE PAGE:

AT [73] ASSIGNEE:

"Assignee: Canon Kabushiki Kaisha, Tokyo, Japan" should read --Assignees: Canon Kabushiki Kaisha, Tokyo, and Canon Aptex Inc., Mitsukaido-shi, both of Japan--.

AT [56] References Cited - U.S. PATENT DOCUMENTS:

"5,172,142  12/1992  Stephenson" should read --5,172,145  12/1992  Stephenson--.

COLUMN 1:

Line 36, "take-Up" should read --take-up--.

COLUMN 2:

Line 15, "and-a" should read --and a--;
Line 23, "1" should be deleted;
Line 49, "time,for" should read --time for--.

COLUMN 4:

Line 15, "(OHP Apparatus)" should begin a new paragraph.

COLUMN 5:

Line 22, "from" should read --from being--;
Line 61, "Which" should read --which--.

UNITED STATES PATENT AND TRADEMARK OFFICE
CERTIFICATE OF CORRECTION

PATENT NO. : 5,446,511  Page 2 of 3
DATED : August 29, 1995
INVENTOR(S) : Yoshihiko KITAHARA, et al.

It is certified that error appears in the above-indentified patent and that said Letters Patent is hereby corrected as shown below:

COLUMN 6:

Line 26, "rolls That" should read --rolls are rotatably supported by the front and rear frames. That--;
Line 27, "are rotatably" should be deleted;
Line 28, "supported by the front and rear frames" should be deleted;
Line 44, ".of" should read --of--.

COLUMN 7:

Line 21, "the-original" should read --the original--.

COLUMN 8:

Line 36, "in" should read --In--.

COLUMN 10:

Line 29, "wrinkle" should read --wrinkle.--.

COLUMN 16:

Lines 3-8, Claim 8 should read as follows:
--8. An overhead projector comprising:
an original conveying apparatus comprising original stacking means on which originals are stacked, separation and convey means for separating the stacked

UNITED STATES PATENT AND TRADEMARK OFFICE
CERTIFICATE OF CORRECTION

PATENT NO. : 5,446,511
DATED : August 29, 1995
INVENTOR(S) : Yoshihiko KITAHARA, et al.

It is certified that error appears in the above-indentified patent and that said Letters Patent is hereby corrected as shown below:

originals from an upper side and conveying the separated originals, elongated conveying and holding means for holding the originals separated and conveyed by said separation and convey means and conveying the originals to a reading portion, first and second wind-up means for winding thereon said conveying and holding means holding the originals in page sequence in rolled state, and discharge means for conveying the originals wound on said first wind-up means reversely by winding said conveying and holding means onto said second wind-up means, thereby discharging the originals onto the originals stacked on said original stacking means; and
projecting means for projecting an image read from the original conveyed to said reading portion by said original conveying apparatus onto a screen.--.

Signed and Sealed this

Second Day of April, 1996

Attest:

BRUCE LEHMAN

Attesting Officer  Commissioner of Patents and Trademarks